(12) United States Patent
Rotsaert

(10) Patent No.: US 11,238,434 B2
(45) Date of Patent: Feb. 1, 2022

(54) ACTIVE PERIPHERAL DEVICE AND ELECTRONIC PAYMENT TERMINAL

(71) Applicant: INGENICO INC., Alpharetta, GA (US)

(72) Inventor: Christopher Rotsaert, Wasquehal (FR)

(73) Assignee: INGENICO INC., Alpharetta, GA (US)

( * ) Notice: Subject to any disclaimer, the term of this patent is extended or adjusted under 35 U.S.C. 154(b) by 629 days.

(21) Appl. No.: 15/205,947

(22) Filed: Jul. 8, 2016

(65) Prior Publication Data

US 2017/0011385 A1 Jan. 12, 2017

(30) Foreign Application Priority Data

Jul. 10, 2015 (FR) ...................................... 1556596

(51) Int. Cl.
*G06Q 20/32* (2012.01)
*G06Q 20/34* (2012.01)
*G07F 7/08* (2006.01)

(52) U.S. Cl.
CPC ....... *G06Q 20/3278* (2013.01); *G06Q 20/352* (2013.01); *G07F 7/0873* (2013.01); *G07F 7/0893* (2013.01)

(58) Field of Classification Search
USPC ........................................................ 705/39
See application file for complete search history.

(56) References Cited

U.S. PATENT DOCUMENTS

| 7,760,098 | B2* | 7/2010 | Sato | H01Q 1/2216 340/572.7 |
| 8,384,519 | B2* | 2/2013 | Kuhl | G06K 7/0008 340/10.1 |
| 8,698,676 | B2* | 4/2014 | Ikuta | H01Q 7/00 343/702 |
| 2005/0156026 | A1 | 7/2005 | Ghosh et al. | |
| 2016/0012465 | A1* | 1/2016 | Sharp | G06Q 20/18 705/14.17 |

FOREIGN PATENT DOCUMENTS

| DE | 102007028100 A1 | 12/2008 |
| FR | 2795845 A1 | 1/2001 |
| WO | 2013132426 A1 | 9/2013 |

OTHER PUBLICATIONS

Ortiz ("Is near-field communication close to success?", Mar. 1, 2006, Computer (vol. 39, Issue: 3, pp. 18-20).*

(Continued)

*Primary Examiner* — Gregory A Pollock
(74) *Attorney, Agent, or Firm* — David D. Brush; Westman, Champlin & Koehler, P.A.

(57) ABSTRACT

A peripheral device intended to be coupled in a mobile and removable manner to an electronic payment terminal having contactless communication. The peripheral device includes at least one first portion of a contactless communication of the electronic payment terminal and at least one connector that cooperates, when the peripheral device is coupled to the electronic payment terminal, with at least one complementary connector on the electronic payment terminal. The connectors form a wireline communication between the first portion of the contactless communication of the peripheral device and the electronic payment terminal.

6 Claims, 4 Drawing Sheets

(56) References Cited

OTHER PUBLICATIONS

International Search Report dated Aug. 31, 2016 for corresponding International Application No. PCT/IB2016/054465, filed Jul. 26, 2016.
Written Opinion of the International Searching Authority dated Aug. 31, 2016 for corresponding International Application No. PCT/IB2016/054465, filed Jul. 26, 2016.
French Search Report and Written Opinion dated Apr. 22, 2016 for corresponding French Application No. 1556596, filed Jul. 10, 2015.
Machine translation of Written Opinion of the International Preliminary Examining Authority dated Jun. 16, 2017 for corresponding International Application No. PCT/IB2016/054465, filed Jul. 26, 2016.

* cited by examiner

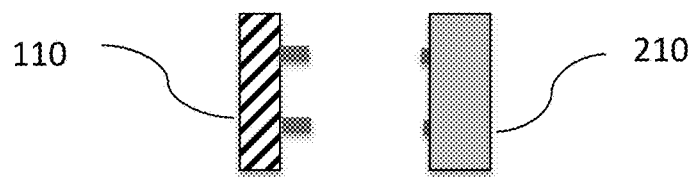
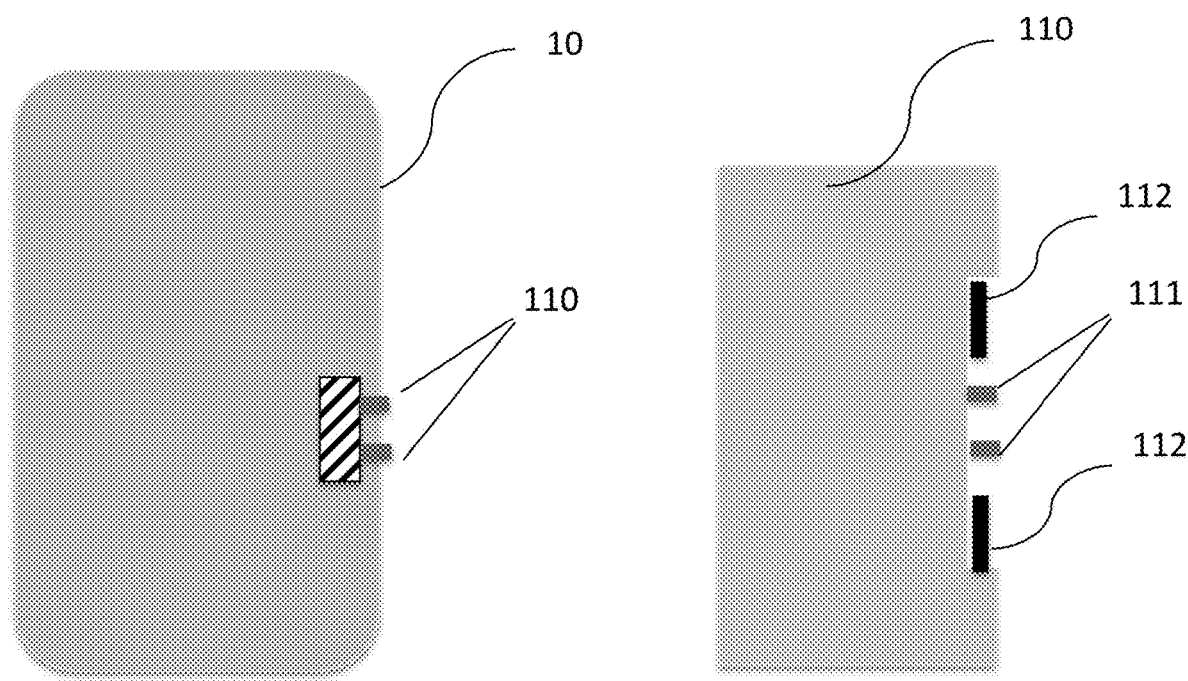
Figure 2a
Figure 2b
Figure 2c

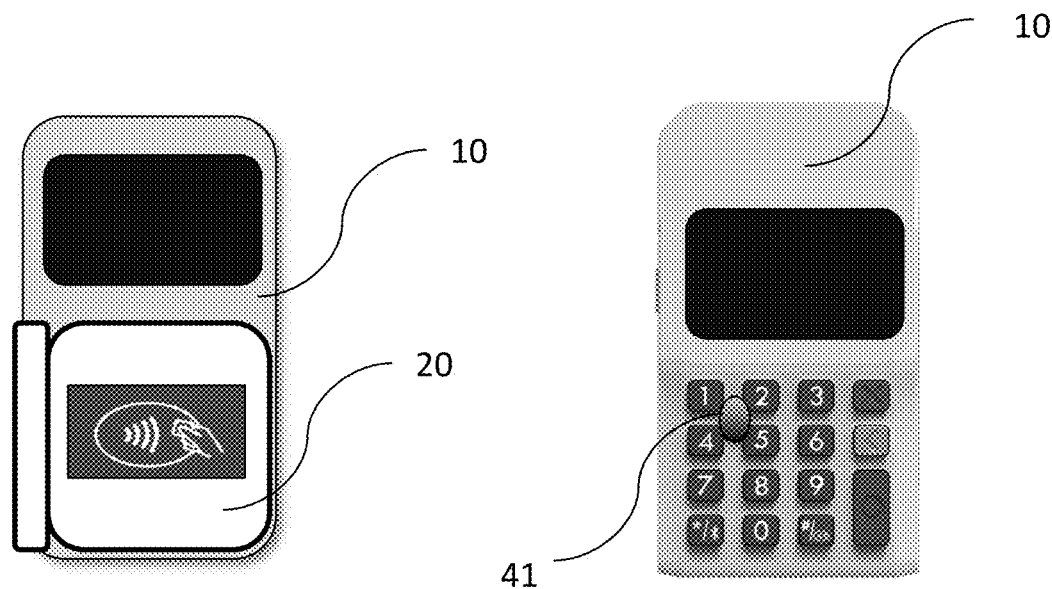
Figure 3a                    Figure 4a
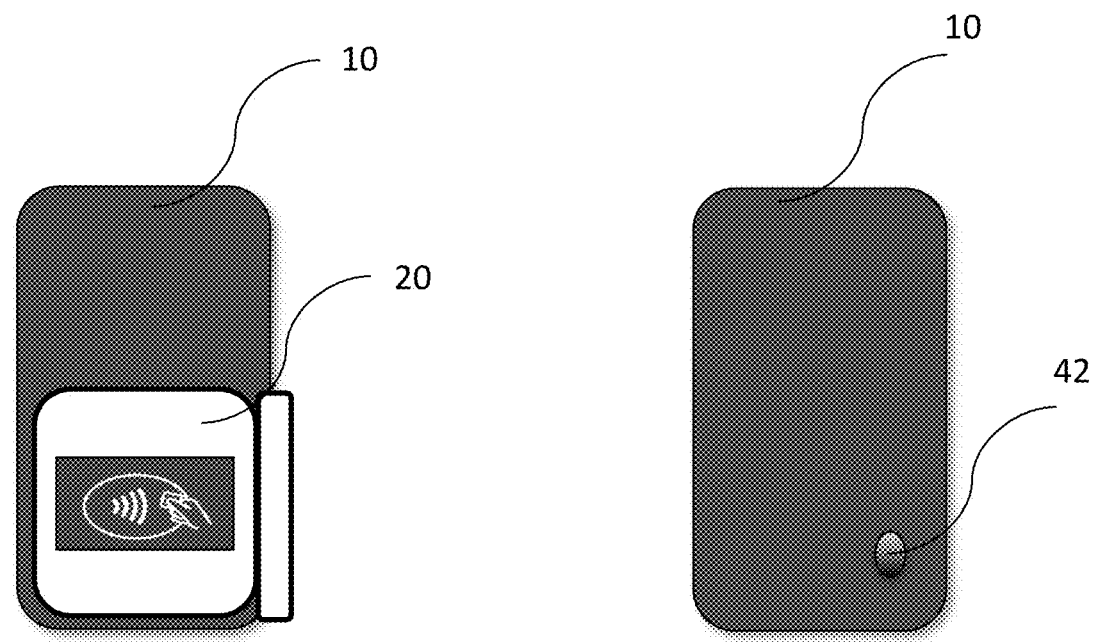
Figure 3b                    Figure 4b

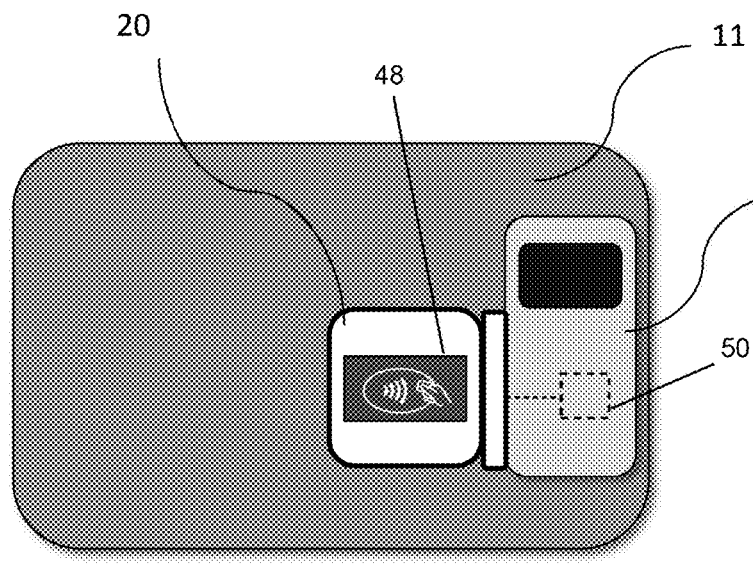
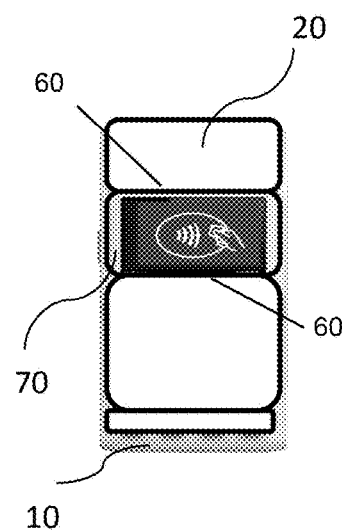
Figure 5
Figure 7
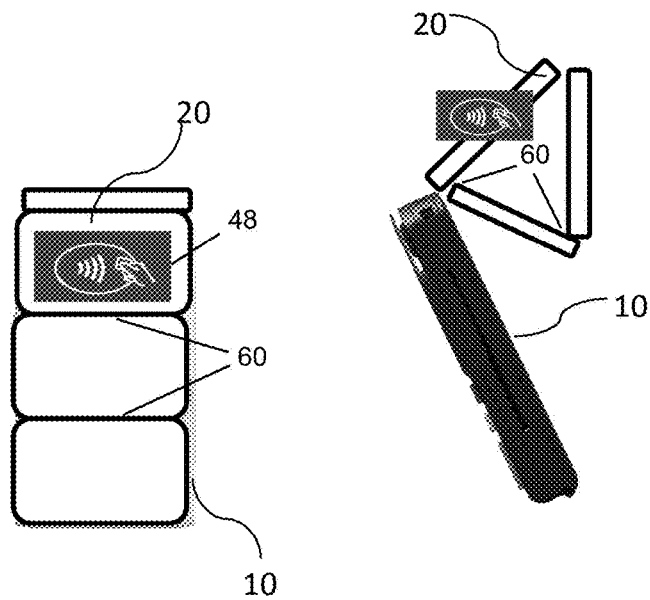
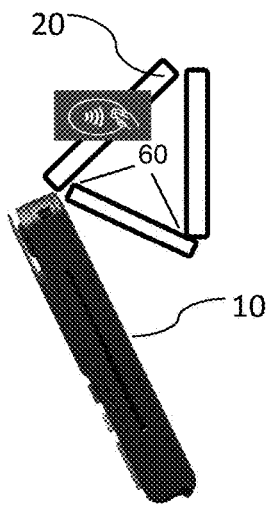
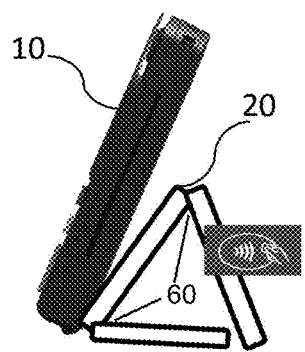
Figure 6a
Figure 6b
Figure 6c

ACTIVE PERIPHERAL DEVICE AND ELECTRONIC PAYMENT TERMINAL

This application claims priority to and the benefit of French Patent Application No. 1556596, filed Jul. 10, 2015, the content of which is incorporated herein by reference in its entirety.

FIELD OF THE INVENTION

This invention relates to the field of electronic payment terminals and more particularly to terminals that propose a contactless payment functionality, in particular via means of contactless communication.

More precisely, the invention relates to the optimisation of the implementation of these means of contactless communication regardless of the use of the electronic payment terminal.

Solutions of Prior Art

Most of the current electronic payment terminals include the contactless payment functionality, which makes it possible in particular to carry out a transaction by presenting a payment card also provided with this functionality in front of the contactless reader, without having to enter a confidential code.

In order to offer the user (for example a consumer) optimum ergonomics, a logo indicating the "contactless" functionality is affixed on the reader, on the antenna, in such a way that the user presents the card in a precise manner in order to enable the reading of the information required for the payment.

The development of an electronic payment terminal that has the contactless functionality is governed by a certain number of constraints, which makes it complex.

As such, the EMVCo® specifications impose for example that the "contactless" logo be located at the centre of the antenna, in order to provide for the optimum positioning of the payment card of the consumer. The location of the antenna must therefore be chosen in such a way that the corresponding logo can be placed in a visible manner on the electronic payment terminal, which makes it difficult to place the antenna on the front face of the electronic payment terminal, which most often is already provided with a screen and keyboard.

Currently, the antenna is therefore for example positioned under the screen of the electronic payment terminal, as shown in FIG. 1a, but the rounded shapes of contactless antennas are not always compatible with increasingly smaller electronic payment terminals, and of which the screens are increasingly smaller.

In addition, positioning the antenna on the rear face (101) of the electronic payment terminal (as shown for example in FIG. 1b) is incompatible with certain uses, which are increasingly frequent, of the electronic payment terminal combined with another electronic device, such as for example a tablet or a smartphone. Indeed, in such a situation, shown for example in FIG. 1c, the electronic payment terminal (10) must be positioned on the rear face of the tablet (11), via its own rear face, as such rendering it unusable for positioning the antenna.

Finally, as a mobile electronic payment terminal can be directed on the shopkeeper side or on the consumer side, it is not easy to find the most appropriate position for the antenna, regardless of the use of the electronic payment terminal.

As such, there is a need for a new technique of implementing means of contactless communication of an electronic payment terminal, that make possible optimum contactless communication ergonomics and performance, at least cost.

SUMMARY OF THE INVENTION

The invention propose a new solution which does not have all of these disadvantages of prior art, in the form of a peripheral device intended to be coupled in a mobile and removable manner to an electronic payment terminal that comprises means of contactless communication, with the peripheral device comprising at least one first portion of the means of communication of the electronic payment terminal. According to the invention, the peripheral device comprises at least one connector that cooperates, when the peripheral device is coupled with the electronic payment terminal, with at least one additional connector on the electronic payment terminal, with the connectors forming means of wireline communication between the first portion of the means of contactless communication of the peripheral device and the electronic payment terminal.

As such, the invention proposes, according to its various embodiments, a new and inventive solution for implementing the "contactless" functionality of an electronic payment terminal that makes it possible to optimise the performance of this contactless functionality by arranging a portion of its means on a peripheral device intended to be associated/coupled with the electronic payment terminal.

To do this, connectors arranged respectively on the peripheral device and the electronic payment terminal make it possible, when the peripheral device is coupled with the electronic payment terminal, to provide a wireline communication between the elements of the contactless functionality of the peripheral device and the communication terminal.

In this way, if the means of contactless communication are distributed between the peripheral device and the electronic payment terminal, the various portions of the means of contactless communication can communicate via these connectors when the peripheral device and the electronic payment terminal are assembled/coupled. For example, if the antenna is arranged on the peripheral device and the printed circuit associated with the antenna (adaptation, processing the data received, etc.) is arranged on the electronic payment terminal, the data received by the antenna can be sent to the printed circuit via these connectors.

According to another embodiment, if all of the means of contactless communication are arranged on the peripheral device, they however must communicate with certain elements of the electronic payment terminal, for example for processing the data received by the antenna, and can do so via these connectors.

Such connectors are for example piston-contact connectors, on the electronic payment terminal, and complementary connectors (bearing surface) on the peripheral device.

According to a particular characteristic of the invention, the first portion of the means of contactless communication comprises an antenna able to receive data and the data received by the antenna transits via the means of wireline communication to at least one processing module arranged on the communication terminal.

As such, according to a first alternative of this embodiment, when the antenna that is part of the means of contactless communication is arranged on the peripheral device, the data read/received by this antenna is sent, via the connectors located on the peripheral device and the electronic payment terminal providing means of wireline communication, to the electronic payment terminal (for example to a processing module that allows the data received to be used).

According to a second alternative embodiment, when all of the elements forming the means of contactless communication (the antenna, the printed circuit allowing for the adaptation of the antenna for example, etc.) are arranged on the peripheral device, the data read/received by the antenna is also sent, via the connectors located on the peripheral device and the electronic payment terminal providing means of wireline communication, to the electronic payment terminal (for example to a processing module making it possible to use the data received). This second alternative advantageously makes it possible to market the peripheral device independently of the electronic payment terminal, as an "active" peripheral device allowing a "contactless functionality to be implemented on the electronic payment terminal, when the peripheral device is assembled/coupled with the electronic payment terminal. According to this second alternative in fact, only the connection elements allowing for wireline communication between the peripheral device and the electronic payment terminal have to be provided on the electronic payment terminal, as well as the module for processing the data received by the antenna.

For example, the peripheral device corresponds to a protective case of the electronic payment terminal.

As such, this embodiment of the invention confers all or a portion of the contactless functionality to a protective case of the electronic payment terminal, originally intended to protect the electronic payment terminal passively, as such allowing for a greater diversity in the positioning of the antenna in particular.

According to a particular embodiment, the protective case of the electronic payment terminal has at least two hinged portions that allow the electronic payment terminal to have at least two separate positions for use, and therefore the antenna located on the case to be able to be presented to the user in several positions of the electronic payment terminal. The constraints for implementing the contactless functionality of an electronic payment terminal are therefore substantially reduced due to the flexibility of use/assembly of the protective case on the electronic payment terminal. Indeed, conventionally, a protective case can be assembled to an electronic device in a plurality of ways, according to whether it is desired to protect the device in order to transport it, or use the case to present the device in a working position, presentation position for a third party, etc.

For example, the antenna is arranged on a transparent portion of the peripheral device. As such, according to this embodiment of the invention, the antenna is arranged on a transparent, or semi-transparent portion of the protective case of the electronic payment terminal, intended to allow for the reading of the information displayed on the screen of the electronic payment terminal.

The invention, according to this embodiment, therefore advantageously takes advantage of a particular characteristic of a protective case of an electronic payment terminal that allows for the visualisation of information on the screen, thanks to a transparent portion (in the wide sense of the term, i.e. a portion through which what is underneath can be distinguished) of the case, even when the case is assembled to the electronic payment terminal. In particular, this embodiment makes it possible to view, through the case, information relating to the contactless functionality (for example the "contactless" logo that allows the consumer to correctly position a payment card interfacing with the antenna of the case in order to carry out a contactless payment).

The invention also relates to an electronic payment terminal comprising means of contactless communication of which at least a first portion is arranged on a peripheral device intended to be coupled in a mobile and removable manner to the electronic payment terminal, with the latter comprising at least one connector that cooperates, when the peripheral device is coupled to the electronic payment terminal, with at least one complementary connector on the peripheral device, with the connectors forming means of wireline communication between the first portion of the means of contactless communication of the peripheral device and the electronic payment terminal.

According to a particular aspect of the invention, the electronic payment terminal comprises:
  at least one module for detecting at least one characteristic belonging to the group comprising:
  the presence of the first portion of the means of contactless communication;
  the position of the first portion of the means of contactless communication;
  a module for processing the characteristic that delivers at least one piece of information of adaptation of the means of contactless communication.

As such, the invention, according to its various embodiments, proposes a new and inventive solution for implementing the "contactless" functionality on an electronic payment terminal, by offsetting all or a portion of the means that provide this functionality on a peripheral device intended to be coupled/assembled in a mobile and removable manner to the electronic payment terminal, in such a way as to optimise the performance of this contactless functionality, in particular regardless of the position of the electronic payment terminal and regardless of its use (independently or attached to another device).

For example, the invention makes it possible, according to its various embodiments, to propose an optimum "contactless" functionality whether the electronic payment terminal is directed facing the customer or facing the shopkeeper, and whether the electronic payment terminal is used independently or associated with a communication terminal such as a tablet or a smartphone (in this case, the electronic payment terminal is positioned on the rear of the communication terminal).

To do this, the electronic payment terminal has in particular a module for detecting which makes it possible for example to detect the presence of the means of contactless communication located on the peripheral device, and/or to detect the position of these means of communication, in such a way as to be able, where applicable, to adapt the circuit associated with the antenna in order to optimise the performance, thanks to a module for processing the information delivered by the module for detecting.

For example, if the antenna is positioned on the peripheral device and the circuit associated on the electronic payment terminal, the latter can detect not only the presence of the antenna, but also its position in such a way as to implement one or several filters, on the electronic payment terminal, which makes it possible to adapt the integrated circuit associated with the antenna in order to optimise the performance of the antenna, regardless of its position in relation to the electronic payment terminal.

For example, if the peripheral device is a protective case of the electronic payment terminal, which can be assembled to the electronic payment terminal in different ways (front face, rear face, assembly using one of the four edges of the electronic payment terminal, etc.), the invention can, according to this embodiment, adapt the operation of the antenna present on the case, regardless of the assembly chosen. As such, if the case is positioned on the front face of the electronic payment terminal, it may be that the antenna is closer to any interfering electronic elements than when it is positioned on the rear face of the electronic payment terminal. However this configuration can be necessary in particular when the electronic payment terminal is itself coupled to a tablet, via its rear face.

For example, the module for detecting comprises at least one magnetic detector.

As such, the module for detecting the electronic payment terminal makes it possible to detect the presence of the antenna, when the peripheral device (for example the protective case) is coupled with the electronic payment terminal, thanks to a magnetic detector of the Hall-effect component type.

In addition, such a magnetic detector makes it possible to detect the position of this antenna more precisely, in such a way as to be able to adapt the circuit associated with the antenna in order to optimise the performance of the contactless functionality of the electronic payment terminal.

According to a particular characteristic of the invention, the processing module also delivers information on the activation or deactivation of a contactless payment functionality of the electronic payment terminal.

As such, the detecting of the presence or not of the means of contactless communication also makes it possible to activate or deactivate the corresponding functionality of the electronic payment terminal, namely for example the contactless payment.

For example, when the detection module delivers information on the absence of a means of contactless communication to the processing module, the latter sends information on the deactivation of the contactless payment, to a predetermined element of the electronic payment terminal. This makes it possible to not propose the choice of contactless payment when the corresponding means are not present, in such a way as to not lengthen the processing time of the transaction by a succession of failures to read the contactless payment card due to the absence of means of contactless communication.

LIST OF FIGURES

Other characteristics and advantages of the invention shall appear more clearly when reading the following description of a particular embodiment, provided solely as an example and no restricted, and the annexed drawings, wherein:

FIGS. 1a to 1c, already commented in relation to prior art, show examples of payment terminals according to prior art;

FIGS. 2a to 2c show an example of connectors forming the means of wireline communication between the electronic payment terminal and the peripheral device, according to an embodiment of the invention;

FIGS. 3a, 3b, 4a, 4b and 5 show an example of a payment terminal and of a peripheral device according to a first embodiment of the invention, in several configurations;

FIGS. 6a to 6c show an example of a payment terminal and of a peripheral device according to a second embodiment of the invention, in several configurations;

FIG. 7 shows an example of a payment terminal and of a peripheral device according to a third embodiment of the invention.

DETAILED DESCRIPTION OF THE INVENTION

General Principle

Figure 1A:
Figure 1B:
Figure 1C:
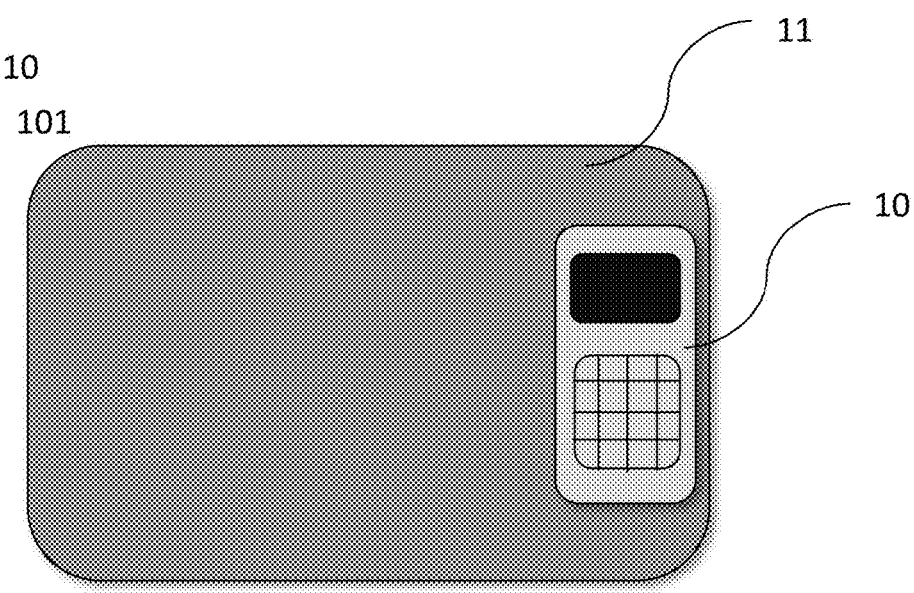

The principle of the invention consists in optimising the implementation of the means of contactless communication of an electronic payment terminal by offsetting a portion of these means on a peripheral device intended to be coupled to the electronic payment terminal, as such allowing for a use of the contactless payment functionality regardless of the mode of use of the electronic payment terminal (independently or coupled to another device), regardless of the position of use (facing the shopkeeper, facing the customer, etc.) and for any type of electronic payment terminal (regardless of its size).

To do this, the invention, according to its various embodiments, implements connectors both on the peripheral device and on the electronic payment terminal, in such a way as to allow for wireline communication between the means of contactless communication offset on the peripheral device and the electronic payment terminal.

According to the various embodiments of the invention, all the means of contactless communication are offset on the peripheral device, or only a portion, as such making it possible to reduce the constraints linked to the contactless functionality for the architecture of the electronic payment terminal.

As such, it is very advantageous to offset at least the antenna on the peripheral device, as the constraints linked with integrating this antenna into an electronic payment terminal are very substantial, as already described with respect to prior art.

Moreover, integrating the maximum number of components required for the contactless functionality in the peripheral device not only makes it possible to substantially reduce the constraints linked to integrating the antenna, but also to market this peripheral device independently of the electronic payment terminal. In this case, the contactless payment functionality is entirely integrated into the peripheral device, which can moreover also integrate functionality for managing the power supply of the electronics present on the peripheral device, for example with an inductive power supply solution. The power supply can also be managed by the integration of a connector that has additional contacts, supporting both data and the power supply.

Description of a First Embodiment

In relation with FIGS. 2a to 2c, an example of a connector that can be used, on the electronic payment terminal and the peripheral device, to allow for wireline communication of data (for example the data read by the antenna located on the peripheral device) between the electronic payment terminal and the peripheral device shall now be presented. Note that the number and the location of the connectors on the electronic payment terminal are not limited to the example shown in FIG. 2b. As such, the configuration of the connector or connectors responds to a problem with the facility of pairing between the electronic payment terminal and the peripheral device, as well as a flexible connection, allowing for easy assembly and removal, without any complex manipulation.

For example, piston connectors 110 can be implanted on the electronic payment terminal, in such a way as to cooperate with complementary connectors 210 on the peripheral device side, when the peripheral device is coupled to the electronic payment terminal.

FIG. 2b shows more particularly the integration of this type of connectors 110 in an electronic payment terminal 10, in such a way that the ends of the pistons extend slightly to bear their opposing surface on the peripheral device side.

FIG. 2c shows a connector 110 and in particular the various elements that it is comprised of, according to this embodiment. As such, according to this embodiment, the connector provides both the function of maintaining the peripheral device, via elements 112 (which can be magnets), as well as the wireline connection function between the electronic payment terminal and the peripheral device via the pistons 111 of the connector. These pistons are positioned slightly retracted on the edge of the electronic payment terminal, in such a way as to protect them from any impacts.

These examples of connectors are described for the purposes of information and any other shape of connector, that provides the same function of forming means of wireline communication when an electronic payment terminal and a peripheral device are coupled, can be implemented. In addition, the number of connectors is chosen according to the various possibilities of assembly desired for the peripheral device on the electronic payment terminal.

In relation with FIGS. 3a, 3b, 4a, 4b and 5, an example of an electronic payment terminal and peripheral device according to a first embodiment of the invention shall now be described.

According to this first embodiment, the peripheral device 20 corresponds to a protective case intended to be assembled/coupled to the electronic payment terminal, via for example mechanical elements such as magnets, which allow the case to be mobile when it is assembled to the electronic payment terminal, and removable and repositionable. Indeed, it is sufficient that several magnets intended for setting in place the case be integrated in different locations on the electronic payment terminal, so that the case can be installed in the electronic payment terminal in different positions. The mechanical elements that allow for the assembly of the peripheral device on the electronic payment terminal can also correspond to elements that allow for resistance that is more secure, such as screws for example, but which even so allow for easy withdrawal by the user.

For example, FIGS. 3a and 3b show respectively a positioning of the peripheral device 20 on a portion of the front face of the electronic payment terminal 10 and on a portion of the rear face of the electronic payment terminal 10.

FIG. 5 shows a positioning of the peripheral device 20 on a side of the electronic payment terminal 10, allowing for a particular use of the electronic payment terminal 10 with a communication device such as a tablet 11. Indeed, in this case of use, the electronic payment terminal 10 is assembled to the communication device 11 via their respective rear faces.

Moreover, according to this embodiment of the invention, the case 20 carries a portion of the means of contactless communication 48 that allow the electronic payment terminal to propose a contactless payment functionality. More particularly, the case 20 carries at least the antenna, as shown by the "contactless" logo appearing on the case 20.

As such, as shown in FIGS. 3a, 3b and 5, this embodiment allows for optimum use of the contactless payment functionality, regardless of the position of the electronic payment terminal: facing the customer (FIG. 3a), facing the shopkeeper (FIG. 3b), or assembled to a tablet (FIG. 5).

As already described hereinabove, once the case is coupled to electronic payment terminal, a wireline connection allowing for data communication between the case 20 and the processing module 50 of the electronic payment terminal 10 is made possible thanks to the connectors present respectively on the electronic payment terminal and the case. In this way, the data read by the antenna offset on the case can transit to the electronic payment terminal, in order to be processed and make it possible to finalise the transaction via contactless payment.

In addition, according to this embodiment, the electronic payment terminal also has a module for detecting the presence of means of contactless communication offset on the case, via two magnetic detectors 41 and 42, shown respectively in FIGS. 4a and 4b.

As such, if the case is positioned on the front face of the electronic payment terminal, the antenna is detected by the detector 41, and a method for adapting the performance of the antenna can be implemented, in such a way as to optimise the contactless payment functionality by taking into account the position of the antenna on the front of the electronic payment terminal.

On the contrary, if the case is positioned on the rear face of the electronic payment terminal, the antenna is detected by the detector 42, and a method for adapting the performance of the antenna can be implemented, in such a way as to optimise the contactless payment functionality by taking into account the position of the antenna on the rear of the electronic payment terminal.

Such a method of adapting the performance of the antenna consists for example in applying filters on the electronic payment terminal in order to optimise the performance of the antenna.

For example, according to the position detected of the antenna, the circuit can "activate" ferrites. Components of this type make it possible indeed to filter the signal between the antenna and the "contactless" component (for example an NFC reader IC) and are conventionally added when the antenna is in the vicinity of the metal portions of the electronic payment terminal. On the other hand, when the distance between the antenna and its metal portions of the electronic payment terminal is sufficient, these ferrites are not necessary and even harmful. The invention as such makes it possible to control, via the position detector (the detection module 41, 42), the activation of these ferrites, as such making it possible for example to support a so-called "free field" antenna position, i.e. with the case open (therefore the antenna far from the electronics of the electronic payment terminal), as well as a position with the case closed (therefore the antenna near the electronics of the electronic payment terminal).

According to the shape of the case, additional elements for detection can be integrated into the electronic payment terminal, in such a way as to allow for the use of means of contactless communication in the best conditions, regardless of the position of the case on the electronic payment terminal.

As such, this embodiment makes it possible to optimise the contactless payment functionality available on the electronic payment terminal, when its protective case is positioned, without any additional constraint for the architecture of the terminal.

Moreover, this module for detection can also be used for activating or deactivating the contactless functionality of the electronic payment terminal. As such, when no antenna is detected (for example when the case is not assembled to the electronic payment terminal, or is incorrectly positioned), the possibility of contactless payment is not offered to the shopkeeper.

Likewise, this module for detecting makes it possible to activate the contactless function solely when the antenna present in a preview/authorised position (in "free field" or in a certified position). As such, for requirements with regards to certification, it is indeed necessary to be able to "neutralise" the function in "unauthorised" positions of the antenna.

Moreover, as the contactless function consumes a substantial amount of battery power, there is a great interest in being able to automatically deactivate this function for an electronic payment terminal mobile for example.

Description of a Second Embodiment

In relation with FIGS. 6a to 6c, an example of an electronic payment terminal and of a peripheral device according to a second embodiment of the invention is described, wherein the peripheral device corresponds to a protective case that has several hinged portions connected by hinges 60.

The plurality of the portions of this protective case makes it possible in particular to multiply the positioning of the electronic payment terminal (as shown in FIGS. 6b and 6c) and therefore the positioning of the means of contactless communication 48 offset on this case.

For example, if it is considered that at least the antenna is integrated into the case, it can be on one of the three portions, for example the one closest to the means of assembly of the case to the electronic payment terminal, as shown in FIG. 6a. Due to this, when the portions of the case are arranged in such a way as to allow for the presentation of the electronic payment terminal as shown for example in FIGS. 6b and 6c, the antenna offset on one of the portions of the case still remain accessible for a contactless payment. For example, the configuration shown in FIG. 6c allows the shopkeeper to keep the electronic payment terminal facing him, for example in order to enter via the keyboard data such as the amount of the transaction, while directing the "contactless" portion towards the customer so that their contactless payment card can be brought closer. This configuration makes it possible to reduce the manipulations of the electronic payment terminal and as such the risks of falling or inadvertent entering of data.

Description of a Third Embodiment

In relation with FIG. 7, a third embodiment of the invention is now presented, wherein the peripheral device also corresponds to a protective case of the electronic payment terminal, having several portions, of which one (70) is transparent or semi-transparent.

According to this third embodiment, the means of contactless communication 48, or at least the antenna, are integrated into this "transparent" portion of the case, as such making it possible, when the case covers the front face of the electronic payment terminal, to display on the screen of the electronic payment terminal the "contactless" logo in such a way that the consumer knows where to present his contactless payment card.

This embodiment as such makes it possible to not screen print the contactless logo on the case, while still satisfying the EMVCo® requirements by displaying this logo on the screen of the electronic payment terminal, for example solely when the contactless functionality is activated, with this logo able to be viewed through the transparent portion. This embodiment also makes it possible to propose to the user (for example the shopkeeper) a protective "neutral" case, without a logo, which offers the possibility of viewing the screen of the electronic payment terminal even when the case is positioned to protect the front face of the electronic payment terminal.

The interest is that in this case, the "Contactless" logo is present only in the provided position and avoids any confusion with the possible use the function in a position wherein the logo can be seen but the function not activated.

The invention claimed is:

1. A peripheral device configured to be coupled in a mobile and removable manner to an electronic payment terminal that form a contactless communication circuit, said peripheral device comprising:
 a plurality of portions comprising at least a first portion, a second portion, and a third portion, where said peripheral device includes a protective case configured to be coupled to said electronic payment terminal and where the peripheral device comprises at least two hinged portions connecting adjacent portions of the plurality of portions that allow the electronic payment terminal to have at least two separate positions for use
 at least one piston contact connector that cooperates, when said peripheral device is coupled to said electronic payment terminal, with at least one complementary connector on said electronic payment terminal, with said connectors forming wireline communication between said first portion of the contactless communication circuit of said peripheral device and said electronic payment terminal;
 where said first portion of the contactless communication circuit comprises an antenna that receives payment data and transmits said received payment data via said wireline communication to at least one processing module located on said electronic payment terminal.

2. The peripheral device according to claim 1, wherein said antenna is arranged on a transparent portion of said peripheral device.

3. An electronic payment terminal configured to be coupled in a mobile and removable manner to a peripheral device that form a contactless communication circuit comprising:
 at least one piston contact connector that cooperates, when said peripheral device is coupled to said electronic payment terminal, with at least one complementary connector on said electronic payment terminal, with said connectors forming wireline communication between said first portion of the contactless communication circuit of said peripheral device and said electronic payment terminal;
 where the peripheral device comprises a plurality of portions comprising at least a first portion, a second portion, and a third portion, where said peripheral device includes a protective case configured to be coupled to said electronic payment terminal and where the peripheral device comprises at least two hinged portions connecting adjacent portions of the plurality of portions that allow the electronic payment terminal to have at least two separate positions for use;
 where said first portion of the contactless communication circuit comprises an antenna that receives payment data and transmits said received payment data via said wireline communication to at least one processing module located on said electronic payment terminal.

4. The electronic payment terminal according to claim 3, wherein said electronic payment terminal comprises:
 at least one detection module, which detects at least one characteristic belonging to the group comprising: presence of said first portion of the contactless communication circuit; position of said first portion of the contactless communication circuit; a processing module, which is configured to process the characteristic and deliver at least one piece of information of adaptation of the contactless communication circuit.

5. The electronic payment terminal according to claim 4, wherein said detection module comprises at least one magnetic detector.

6. The electronic payment terminal according to claim 4, wherein said processing module also delivers information on activation or deactivation of a contactless payment functionality of the electronic payment terminal.

\* \* \* \* \*